United States Patent [19]
Sullivan et al.

[11] Patent Number: 5,565,158
[45] Date of Patent: Oct. 15, 1996

[54] PROCESS FOR RECYCLING MULTICOMPONENT MIXED POLYMER WASTES

[75] Inventors: James P. Sullivan, Fair Play, S.C.; Matthew B. Hoyt, Arden, N.C.

[73] Assignee: BASF Corporation, Mount Olive, N.J.

[21] Appl. No.: 342,013

[22] Filed: Nov. 16, 1994

[51] Int. Cl.⁶ .............. D01D 1/10; D01D 5/098; D01D 5/12; D01F 13/04
[52] U.S. Cl. ............ 264/103; 264/169; 264/172.17; 264/172.18; 264/210.8; 264/211; 264/290.5; 264/DIG. 69
[58] Field of Search .............. 264/37, 103, 169, 264/171, 210.5, 210.6, 210.8, 211, 235.6, 290.5, 290.7, 346, DIG. 69, 172.17, 172.18

[56] References Cited

U.S. PATENT DOCUMENTS

| | | | |
|---|---|---|---|
| 3,531,368 | 9/1970 | Okamoto et al. | 264/171 X |
| 3,658,981 | 4/1972 | Fleming et al. | 264/349 |
| 3,718,534 | 2/1973 | Okamoto et al. | 264/171 X |
| 4,370,114 | 1/1983 | Okamoto et al. | 425/131.5 |
| 5,009,586 | 4/1991 | Pallmann | 264/DIG. 69 |
| 5,145,617 | 9/1992 | Hermanson et al. | 264/37 |
| 5,162,074 | 11/1992 | Hills | 156/644 |
| 5,225,130 | 7/1993 | Deiringer | 264/37 X |
| 5,241,066 | 8/1993 | Davis et al. | 540/540 |
| 5,294,384 | 3/1994 | David et al. | 264/37 |
| 5,424,013 | 6/1995 | Lieberman | 264/37 X |

*Primary Examiner*—Leo B. Tentoni
*Attorney, Agent, or Firm*—Depaoli & Frenkel, P.C.

[57] ABSTRACT

A process of recycling a multicomponent mixed polymer waste material involves the steps of agglomerating the multicomponent mixed polymer waste material and spinning the agglomerate to form yarn, wherein the multicomponent mixed polymer waste material contains a blend of at least two incompatible polymers.

41 Claims, 3 Drawing Sheets

PROCESS FOR RECYCLING MULTICOMPONENT MIXED POLYMER WASTES

BACKGROUND OF THE INVENTION

This invention relates to a process for recycling multicomponent mixed polymer waste. More particularly, this invention relates to a process for recycling multicomponent mixed polymer waste by converting it to yarn.

Recycling waste into useful materials is a growing goal in modern society. Landfills are becoming filled to capacity and new sites are hard to find. Another reason for recycling waste is the global depletion of raw materials needed to make fresh material. Polymer waste, often made from petroleum products, is a fertile area for recycling. Man-made polymers generally do not degrade quickly and petroleum raw materials will eventually be depleted.

Mixed multicomponent polymer waste (polymer mixtures containing two or more polymer components) is a particularly fertile material for recycling. One example of a mixed multicomponent polymer waste system is the bicomponent fiber and products made from bicomponent fibers.

Compared to single component fibers, bicomponent fibers have improved properties for some applications. Bicomponent fibers are made up of two different polymer components which are present as two separate domains. In multicomponent fibers, two or more different polymer components exist as separate domains. Bicomponent and multicomponent fibers are to be distinguished from biconstituent and multiconstituent fibers, respectively, which contain two (biconstituent) or two or more (multiconstituent) different polymers as a mixture rather than as separate domains.

Examples of bicomponent fiber structures include sheath/core, islands-in-the-sea, side-by-side and other configurations such as those disclosed in U.S. Pat. Nos. 3,718,534; 4,370,114; 3,531,368; and 5,162,074; each of the foregoing references being incorporated herein in its entirety.

One popular bicomponent fiber has a nylon 6 (polycaproamide) sheath and a polyethylene terephthalate (PET) core. This type of fiber is especially useful in making non-woven webs since nylon 6 melts at a lower temperature than PET does, which, on heating to at least the melting point of nylon 6, causes spot welding where individual filaments cross. However, certain applications of these bicomponent fibers can generate large quantities of scrap, which are targeted for landfilling. For example, fabric manufacturing processes and automotive carpet backing applications using COLBACK (Registered Trademark of Akzo) yarn (23% nylon 6 sheath, 77% PET core) generate large amounts of yarn scrap, fabric scrap and edge-trim scrap. For example, fabric manufacturing results in over 200 metric tons of scrap per year being sent to landfills, with this amount expected to increase with current and planned production expansions.

Recycled mixed polymer scrap can be quite valuable in the right applications. A particularly desirable option for recycling mixed polymeric waste such as COLBACK yarn and fabric scrap is to convert the waste into yarn for insertion into new fabric.

However, mixed polymer wastes present unique problems for recycling. For example, a drawback to recycling COLBACK yarn scrap and fabric scrap is that although nylon and PET, individually, can be readily recycled, mixtures of nylon and PET are not easily recycled. Recycling of mixed polymeric waste generally involves separation of the polymer components. Separation processes generally involve mechanical separation, chemical separation or a mixture of these approaches. Separating nylon and PET by these conventional processes is not usually economical, however.

Mechanical separation of solids include size and density-based techniques, using such instruments as cyclones and screen classifiers, which require the solids to be physically distinct particles. In recycling COLBACK yarn scrap and fabric scrap, the scrap must be ground to sizes that will readily break into nylon and PET particles. This requires grinding to form particles that are smaller than the diameter of the COLBACK yarn filaments, which have a diameter of about 40 micrometers. Thus, the COLBACK yarn and fabric scrap must be ground to particles fine enough to pass through a 400 mesh screen (37 micrometer size holes). While equipment (such as the Mikro-Atomizer available from Pulverizing Machinery Co.) is available to do this, the process of grinding polymers is difficult and generally expensive, often requiring cryogenic processes.

A chemical separation process for recovering nylon 6 from COLBACK yarn waste is disclosed, for example, in U.S. Pat. No. 5,241,066, which is assigned to BASF Corp. However, a major drawback to using chemical separation processes to separate nylon 6 and PET from mixtures thereof is that there are several solvents that will dissolve nylon 6 but will not dissolve PET. Environmental concerns regarding the use of solvents also makes chemical separation processes undesirable.

Recycling mixed polymer waste can be further hindered if the mixed polymers are incompatible. In general, polymer blends are either compatible or incompatible. Compatible blends, such as certain concentrations of polybutylene terephthalate (PBT) in PET, normally exhibit a single melting point and appear as a homogenous material when viewed under a microscope. Incompatible blends, such as most concentrations of nylon 6 in PET, exhibit multiple melting points and appear as a heterogenous mixture when viewed under a microscope. Incompatible blends often have poor adhesion between the phases.

In the molten state, incompatible polymer blends form liquid dispersions. The behavior of liquid dispersions is fairly well understood for Newtonian fluids but poorly understood for viscoelastic fluids such as polymer melts.

The morphology of these incompatible liquid dispersions presents certain challenges to the spinning and drawing processes. As has been shown, incompatible liquid dispersions such as nylon/PET dispersions display a morphology where one polymer forms globules that are surrounded by the other polymer. The size and shape of these globules affect the properties of the final yarn.

For example, the size and shape of the globules can limit fiber formation from the melt. In general, the globules must be significantly smaller than the spinneret capillary diameter for the mixture to flow in a nearly homogenous manner. Overly large dispersion globules can make fiber spinning impossible. In addition, even if spinning is achieved, large globules can make drawing the spun fibers quite difficult.

The size and shape of the globules are determined by conditions in the melt, where viscous and elastic forces balance the interfacial surface tension between the two immiscible polymers. Globule sizes in melt dispersions are controlled by two dynamic mechanisms: dispersion and coalescence. Dispersion breaks apart globules while coalescence combines them. These mechanisms compete and may reach an equilibrium. Such equilibrium depends on the volumetric concentrations, the local shear rate, type of flow, the interfacial surface tension and the fluid viscosities.

Because smaller globules should make fiber spinning easier, the better processing conditions will encourage globule dispersion and discourage globule coalescence. Globule dispersion is easiest achieved if the ratio of viscosities (globule/matrix) is between about 0.3 and about 1.5 but will not occur if the ratio exceeds 3.0. Dispersion can also be enhanced by decreasing interfacial surface tension and increasing local turbulent shear stress. Compatibilizers or modification of the polymer chemistry (including oxidation) can change the interfacial surface tension. The local shear stress can be increased by many means, such as by increasing the flow rate or by decreasing filtration size and spinneret capillary diameter (though small capillaries may cause other flow problems).

Globule coalescence, which occurs when globules collide and form larger globules, can be suppressed by reducing the volumetric concentration of the globule phase and decreasing the shear rate.

In highly viscous fluids such as polymer melts, dispersion and coalescence may occur slowly, so that equilibrium may not occur during extrusion. If dispersion dominates the process, then longer extrusion residence times should improve the process by reducing globule size. If coalescence dominates the process, shorter residence times should be used to reduce the globule size, thereby improving the process.

During yarn draw-down, which occurs between the die face (or the die swell) and the solidification point of the yarn, the molten polymer flows in extensional flow, during which globule dispersion may continue, along with globule elongation, while coalescence ceases. Elongation stretches the globules into oblong shapes. A globule may break into smaller globules (i.e., disperse) rather than continue to stretch. Both elongating and dispersing the globules should improve the physical properties of the final fiber.

As mentioned above, even if spinning is achieved, drawing a yarn from an incompatible polymer mixture is more difficult than drawing a yarn from a pure polymer or a compatible mixture. In the best case, the blend contains long fibrils that deform along with the matrix polymer. In the worst case, the blend contains large globules that are rigid during drawing. Since the morphology of the yarn depends on the spinning conditions, the tensile behavior of the yarn may vary significantly with variation in spinning. Therefore, processing conditions using incompatible liquid dispersions generally should be designed to yield relatively small globules to make spinning and drawing easier to achieve, resulting in a yarn having improved physical properties.

Several recycling processes use mixed polymers. Reference is made, for example, to Clemson University Professional Development Seminar, "Thermoplastic Waste Reclamation" Feb. 9–10, 1993; Kaminsky, W., "Recycling of Polymeric Materials by Pyrolysis" Makromol Chem , Macromol Symp. 48/49, pp. 381–393 (1991); and Chemical Week, "Honing Technology to Improve Economics", Dec. 18/25, 1991. "Plastic lumber" can be extruded from a mixture of post-consumer polymers, while incineration or "thermal recycling" produces energy from polymer mixtures. Thermal cracking of polymers (pyrolysis) is a developing technology that may be a future option. Most plastics recycling processes, however, require reasonably pure polymers.

Previous efforts, however, to recycle COLBACK yarn scrap and fabric scrap by converting them into yarn have been unsuccessful. The incompatibility of the nylon and the PET is believed to be the reason for the difficulty in forming yarn from the scrap. Even attempts to spin blends of virgin nylon 6 and PET have been unsuccessful.

One object of the present invention, therefore, is to provide a process for recycling multicomponent polymer mixtures.

A further object of the present invention is to provide a process for recycling bicomponent incompatible polymer mixtures.

Another object of the present invention is to provide a process for recycling nylon/PET mixtures.

Still another object of the present invention is to provide a process for recycling COLBACK nylon/PET yarn scrap by converting it into yarn.

These and other objects are achieved in the present invention.

SUMMARY OF THE INVENTION

The present invention is based on the surprising discovery that COLBACK yarn scrap can be recycled and converted into yarn by spinning agglomerated COLBACK yarn scrap. This discovery is particularly surprising since previous attempts to spin blends of virgin nylon 6 and PET have not been successful.

Accordingly, in a broad aspect, the present invention is directed to a process of recycling multicomponent mixed polymer waste, comprising the steps of agglomerating a multicomponent mixed polymer waste material, particularly a fibrous multicomponent mixed polymer waste material, preferably a bicomponent polymer fiber, and spinning the agglomerate into undrawn yarn, wherein the multicomponent mixed polymer waste material contains a blend of at least two incompatible polymers.

Optionally, a drawing step may be included either as a continuous process with spinning or as a secondary discontinuous process after spinning.

The present invention is also directed to yarn produced by the process of this invention and to spunbond articles containing such yarn.

DETAILED DESCRIPTION OF THE INVENTION

Figure 1:
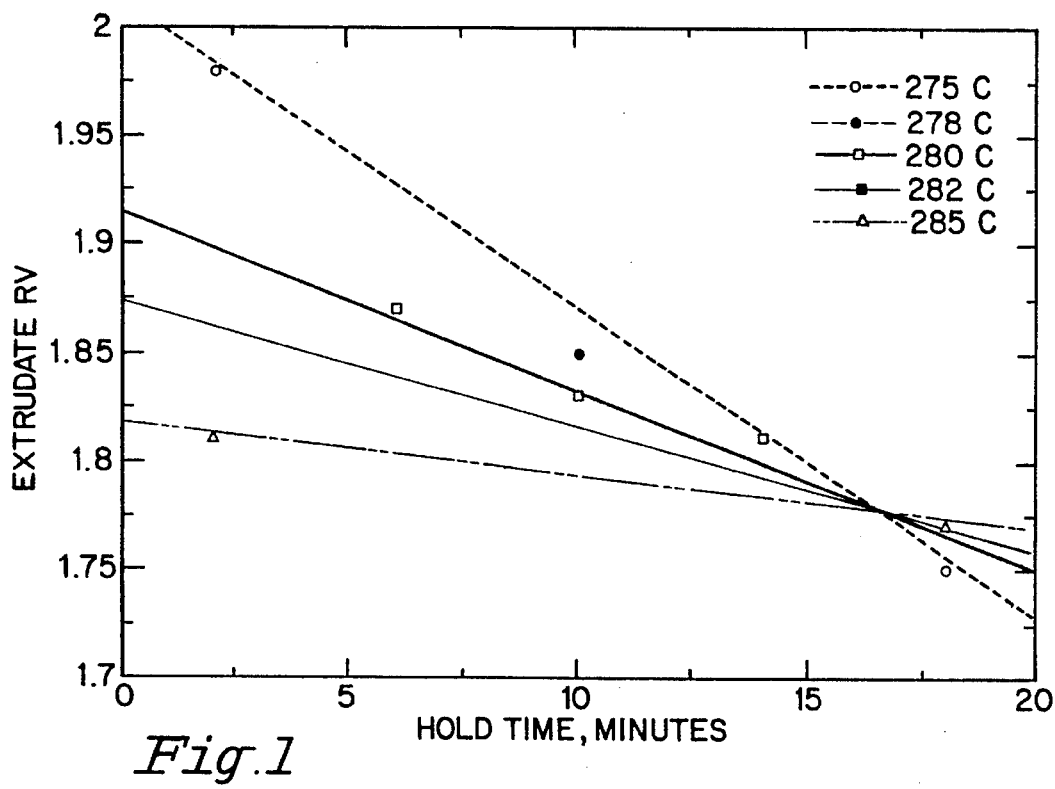
FIG. 1 is a graph showing the relationship between the relative viscosity of a rheometer-extruded nylon/PET agglomerate produced according to the process of this invention and the temperature and holding time.

In a broad aspect of the process of this invention, a multicomponent mixed polymer waste material is agglomerated and the agglomerate is spun to form undrawn yarn.

The multicomponent mixed polymer waste material agglomerated in the process of this invention is a polymer blend generally comprising at least two incompatible polymers.

Incompatible polymers are distinct and separate physical and chemical entities and are to be distinguished from compatible polymers, which are polymers capable of adhering together tenaciously without the use of adhesive or pretreatment and differ from each other only in physical properties such as tactility, crystallinity, molecular weight, or molecular weight distribution.

Examples of incompatible polymer pairs include polyamide (nylon) paired with PET, polybutylene terephthalate (PBT), polypropylene, polyethylene, and a copolymer of vinylidene chloride and vinyl chloride; and polypropylene paired with PET, poly(hexamethylene 1,3-benzenedisulfonamide), poly(beta-propiolactone), polyurea, polystyrene, and poly(methyl-2-cyanoacrylate).

Preferably, the material agglomerated and spun in the process of this invention is a bicomponent incompatible mixed polymer fibrous material. A particular polymer mixture which can be treated in accordance with this invention is a blend of polyamide (nylon) and polyester. Because of the large amounts of COLBACK yarn scrap being sent to landfills each year, as discussed previously herein, it is particularly desirable to treat COLBACK yarn scrap (23% by weight nylon 6 and 77% by weight PET) according to the method of the present invention.

A particular nylon 6 (polycaproamide) which can be used in this invention is dicarboxylic acid-terminated polycaproamide such as that described in U.S. Pat. No. 3,658,981, hereby incorporated by reference herein, are particularly desirable. This dicarboxylic acid-terminated polycaproamide has 10 m.eq. (milliequivalents) of primary amino groups per kilogram of polyamide. The process of this invention is not limited to use of such polyamides, however, but can also use polyamides having, for example, 100 m.eq. of end groups and more than 40 m.eq. of primary amino groups per kilogram of polyamide.

Besides PET, other polyesters useful in the nylon/polyester blends preferred for use in this invention include those disclosed in aforementioned U.S. Pat. No. 3,658,981 (previously incorporated by reference herein). Such polyesters include those having from 1 to 2 aromatic rings in the repeating unit of the main polymer chain, such as, for example, polybutylene terephthalate; polyethylene 2,6-naphthalene dicarboxylate; polyethylene 2,7-naphthalene dicarboxylate; and polyhexamethylene 4,4'-diphenylsulfone dicarboxylate. The polyester may also be a copolyester of two of the foregoing recited polyesters.

The polymer mixture agglomerated in the present invention can contain from about 5 percent by weight to about 95 percent by weight of one polymer and from about 95 percent by weight to about 5 percent by weight of the second polymer. Nylon/PET mixtures treated in accordance with the method of this invention can comprise from about 20 percent by weight to about 25 percent by weight of nylon and from about 75 percent by weight to about 80 percent by weight of PET. As stated previously herein, nylon 6/PET mixtures used in COLBACK yarn and fabric contains about 23 percent by weight of nylon and about 77 percent by weight of PET. Yarn and fabrics with the "COLBACK" designation are available commercially from BASF Corporation. COLBACK yarns and fabrics are discussed, for example, in U.S. Pat. No. 5,241,066, which is hereby incorporated by reference herein.

Prior to agglomeration, the mixed polymer scrap can be in any suitable form such as, for example, chips, powders, yarn, fabric, and the like. Preferably, the scrap will undergo size reduction prior to agglomeration. Size reduction can be carried out, for example, in a granulator, wherein the scrap is formed into chips, flakes, or the like.

The scrap mixture can be agglomerated in any conventional plastcompactor, such as, for example, a CONDUX Plastcompactor (available from CONDUX, Division of HERBOLD Granulators Inc.). Typically, the scrap mixture is introduced into the plastcompactor by means of a feed screw which continuously feeds the scrap into the plastcompactor. The scrap polymer mixture is preferably agglomerated at a temperature within the glass temperature range of the polymer mixture and at a temperature lower than the melting temperature. Agglomeration at such a temperature range prevents thermal degradation of the mixture and minimizes losses in viscosity. Typically, agglomeration is carried out at a temperature ranging from about 10° C. above said material's glass transition temperature to about 10° C. less than the material's glass transition temperature. The glass transition temperature of the polymer mixture can be determined by known methods.

After agglomeration, the compacted scrap material can be reduced in size, if desired, to form granules. Granule formation can be carried out, for example, in a granulator. The agglomerated material will generally be composed of particles having a gravel-like appearance.

The melt viscosity of the agglomerate is important to controlling the spinning of the agglomerate. For example, PET degrades with time, which is evidenced by lower melt viscosity values. The lower the melt viscosity, the shorter the residence time needed in the spinning step. With low-melt viscosity polymer blends, a long residence time can cause nubs in the yarn and oligomer buildup on the spinneret face, seriously impairing the spinning procedure.

Although the agglomerate's melt viscosity is important to controlling the spinning process, the agglomerate's relative viscosity is more convenient to measure.

The melt viscosity of an agglomerate formed from a nylon 6 (23% by weight)/PET (77% by weight) blend preferably ranges from about 60 to about 150 Pa Sec, more preferably from about 75 to about 125 Pa Sec, and most preferably from about 100 to about 125 Pa Sec. The relative viscosity of the agglomerate preferably ranges from about 1.5 to about 2.5, more preferably from about 1.8 to about 2.1, and most preferably from about 1.8 to about 1.95.

For reasons given hereinbelow, the agglomerate preferably contains low moisture levels prior to spinning. Moisture reduction can be effected by either drying the agglomerate itself or by drying (such as by vacuum and heating in a blender) the pre-agglomeration mixture of polymer components, such as the mixture of polymer chips or powders discussed previously herein.

The agglomerate may contain one or more additives such as heat and/or light stabilizers, delustrants, pigments, antistatic agents, lubricants, and the like which are appropriate to the intended end use of the yarn. For example, nylon/PET agglomerates may contain "bridging" agents to increase the wettability or dispersibility of polyester by nylon, whereby to facilitate forming and maintaining a dispersion of molten polyester particles in molten nylon. Typically, the agglomerate may contain up to about 5% by weight of one or more of the additives listed above.

The agglomerate can then undergo spinning using any conventional spinning apparatus, such as, for example, those containing laboratory-scale or full-scale extruders.

An example of a suitable laboratory-scale extruder is an extruder having a screw diameter of one inch and depth of channel in the metering section of 0,031 inch). An example of a suitable full-scale extruder is one having a screw diameter of 3.5 inches and a metering section channel depth of 0.0938 inch. Each extruder can usually feed up to four spinnerets. An hourly throughput of 1 to 5 pounds passing through each spinneret and an hourly throughput of about 25.8 pounds per hour for each 136 hole spinneret/quench stack combination are typical.

Generally, the spinning step involves passing the agglomerate through the extruder, a filter and at least one spinneret, each spinneret containing capillaries.

In the extruder, the agglomerate is subjected to a temperature sufficient to melt the agglomerate (i.e., melting temperature). For nylon/PET blends, this temperature will usually range from about 265° C. to about 285° C.

In the extruder, the agglomerate is typically subjected to an apparent mixing shear sufficient to maintain the particle size in the desired range. The agglomerate contains particles having an average diameter preferably ranging from about 1 to about 5 millimeters, more preferably ranging from about 1 to about 3 millimeters, and most preferably about 3 millimeters.

For nylon/PET polymer blend agglomerates useful in this invention, specific apparent mixing shear values, expressed in terms of velocity gradient, is preferably at least 80 reciprocal seconds and more preferably ranges from about 120 to about 200 reciprocal seconds.

Spinneret shear values, expressed in terms of velocity gradient through the spinneret hole, are preferably about 3000 reciprocal seconds, more preferably at least 5000 reciprocal seconds, and most preferably up to about 30,000 reciprocal seconds.

The most important parameters in spinning performance include spinneret capillary diameter, type of polymer filtration, spinning temperature, and melt residence time. The agglomerate's moisture level also appears to affect spinning behavior.

Each spinneret has capillaries with a diameter sufficient enough to substantially avoid filament breaks at the spinneret. The spinneret capillary size to be used should be large enough to substantially avoid breaks at the spinneret while small enough to substantially avoid filament breaks at a godet over which the spun filament passes during wind up. In general, the capillary size which should be used will depend on the dpf of the filament involved. Typically, the lower the dpf, the smaller the capillary diameter should be. Because the dpf generally depends on the particular polymer blend used in the filament, the appropriate spinneret capillary size can vary depending on the particular polymers in the filament. Those skilled in the art will be able to determine suitable capillary diameters for use with particular polymer blends without undue experimentation.

With nylon/PET agglomerates, the spinneret capillaries preferably have a diameter ranging from greater than 300 micrometers to less than 1200 micrometers, more preferably from about 600 micrometers to about 1000 micrometers. Most preferably, the spinneret capillaries have 800-micrometer diameters. Tests using 300-micrometer diameter capillaries with nylon/PET agglomerates resulted in frequent breaks at the spinneret, while tests with 1200-micrometer diameter capillaries had frequent filament breaks on the godet. The 800micrometer diameter capillary is significantly larger than capillaries used with either nylon or PET alone. This larger capillary diameter improves the yarn behavior by causing elongation of the nylon globules in the molten nylon/PET blend during the extensional flow of melt draw-down. Moreover, the ratio of length/diameter of the capillary should be 1.5 or greater, up to the limit imposed by the increase of pressure, required to force the polymer mixture through a longer capillary at the desired jet velocity. A preferred range of ratios for capillary length/diameter is from about 2 to 5.

The spinneret capillaries can be round or may be slot-shaped, curved, triangular, square, crescent, cross-shaped, star-shaped, Y-shaped, and the like; and/or can be grouped to produce partial coalescence of filaments to form various non-round cross sections. Holes forming hollow filaments can also be used. However, the use of irregular shapes could affect the spinneret shears.

Preferred types of polymer filtration are those which avoid substantial increases in pack pressure and the formation of polymer drips under the spinneret.

With nylon 6/PET blends, the most preferred types of polymer filtration are grade 10 sintered metal candle filters (100 micrometer filtration), e.g., Mott 10 filters, and screen filters. Sintered metal candle filters grade 3 (15 micrometer filtration), e.g., Mott 3 filters, can cause rapid pack pressure build-up and, under some conditions, the formation of polymer blobs under the spinneret. Grade 6 sintered metal candle filters (40 micrometer filtration), e.g., Mott 6 filters, perform much better than grade 3 sintered metal candle filters but can also cause pack pressure to rise.

The spinning temperature should be sufficient to allow substantial spinning of the polymer mixture while avoiding substantial thermal degradation of one or more polymers in the agglomerate. The spinning temperature is a variable which must be controlled within limits to obtain the best spinning performance and yarn quality. Optimum spinning temperatures will depend on the thermal stability and viscosity of the molten polymer blend. Excessively high temperatures can cause thermal degradation, cross-linking and other modifications of the molten polymer blend. Excessively low spinning temperatures may substantially reduce or even eliminate the spinnability of high viscosity blends. Thus, the spinning temperature should be such so as to avoid these problems. Excessively high pressures can cause polymer leakage and operation failure of polymer pumps due to binding therein.

For preferred nylon/PET molten blends, the spinning temperature is preferably from about 265° C. to about 285° C., more preferably from about 275° C. to about 285° C. and most preferably from about 275° C. to about 280° C.

The mean residence time of the agglomerate in the spinneret should be sufficient to avoid substantial thermal degradation of one or more polymers in the mixture. Optimum melt residence times will depend on the thermal stability of the molten polymer blend. If one or both of the polymers degrades with time, excessively long residence times can cause nubs in the yarn and oligomer build-up on the spinneret face.

Because PET tends to degrade with time in the melt, short residence times give the best results for nylon/PET molten blends. Mean residence times of from about 5 to about 10 minutes are preferred for these blends.

As mentioned hereinabove, the agglomerate's moisture content also appears to affect spinning behavior. Minimizing the agglomerate moisture level as well as the melt residence time may minimize polymer degradation.

In preferred nylon/PET agglomerates, the moisture content is preferably less than 0.02 percent by weight and most preferably less than about 0.01 percent by weight.

After being extruded, usually into a quiescent zone, the filaments are carried downward into a cooling or quench zone. Some tension is applied to the extruded filaments by the take-up rolls at the bottom of the quench stack, as usual in melt spinning of multifilament yarn. The tension level is kept at a low level but sufficient to maintain smooth operation. Tension on the molten filament is produced by the action of the take-up rolls and by the weight of the filament below the melt bulge (i.e., a bulge with a diameter (millimeters) greater than that of the spinneret capillary, observed in emerging molten filaments just below their point of emergence from the spinneret), acting to attenuate the molten filament. The tension is related to the extent to which the filament is elongated in being taken up, and this in turn is proportional to the stack draw down, i.e., the take-up speed divided by the jet velocity of the molten polymer stream. Higher jet velocities thus allow lower tension on the molten filament at given throughput and wind-up speeds. The higher jet velocities are also beneficial in reducing the diameter of the melt bulge.

The maximum jet velocity to be used depends on factors such as polymer viscosity, quench air flow, and the like, and is limited by the fact that at excessive jet velocities the extruded filaments develop a melt bulge which intermittently varies in shape, producing irregularities in filament denier and the like.

In the process of this invention, jet velocities preferably do not exceed about 200 feet/min.

The undrawn yarn is then typically taken up on a winder, e.g. a Schweiter winder, after passing over a finish applicator and a godet. Usually, a finish is liberally applied to the yarn.

The molten polymer blend can be drawn either as a continuous process with spinning or as a secondary discontinuous process after spinning and either with or without heating. "Cold drawing" refers to permanently elongating an undrawn filament of a polymer by drawing at a temperature below the polymer glass transition temperature. During "hot drawing" the undrawn filament is drawn on heated godets near or above the glass transition temperature of the two or more polymers.

The undrawn yarn can be drawn in accordance with known procedures such as, e.g., those described in U.S. Pat. No. 3,658,981, previously incorporated by reference herein. For example, the yarn can be drawn for maximum strength as desired in industrial yarns or drawn for high strength and high uniformity (as indicated by the absence of dye streaks and bands) as needed in textile yarns.

The draw ratio (i.e., the ratio of the length of the drawn filament to the length of the spun (undrawn) filament) used in the drawing step is usually based on the breaking elongation of the undrawn yarn. The draw ratio should provide similar drawn yarn breaking elongations. Draw ratios which are too high for a particular undrawn yarn can cause a substantial amount of broken filaments in the drawn yarn. These broken filaments, in turn, reduce the ability of the drawn yarn to be inserted into fabric.

Preferably, in the process of this invention, undrawn nylon/PET yarn is drawn after spinning on heated (preferably from about 80° C. to about 100° C., most preferably about 90° C.) godets at a draw ratio of 3.5 or lower but preferably ranging from about 2.95 to about 3.30, and most preferably ranging from about 2.95 to about 3.0. In tests using a draw-twister, broken filaments occurred frequently with a 3.5 draw ratio but were less frequent with a 3.25 draw ratio. Therefore, although draw ratios up to 3.5 can be used during hot-drawing, lower draw ratios are preferred to reduce the 2number of broken filaments.

The process of this invention can produce undrawn nylon/PET yarn as fine as about 20 denier per filament (DPF), which can be hot-drawn at draw ratios up to 3.50 to form yarn having a DPF of about 6.

Drawn filaments such as those formed from scrap may often contain several inclusions, with little difference being detected between the type of filtration used or the residence time. The source of these inclusions is not understood, but they may be agglomerates of fiber additives such as, e.g., carbon black pigment particles. Inclusions can limit the tensile behavior of the yarn, particularly yarns with low DPF.

The yarn produced by the method of this invention will have a "fibril/matrix" ("islands-in-the sea" or "fibrous") structure, wherein the major polymer will form a matrix or sea and the minor polymer will form fibrils or islands in the matrix or sea. Yarn produced from the COLBACK yarn scrap in accordance with the method of this invention will contain nylon fibrils (islands) dispersed in a PET matrix (sea), the nylon fibrils or islands mainly lying lengthwise along the filament axis.

The yarn produced by the process of this invention can be reinserted into fabric. Typically, a fabric will contain this recycled yarn in a central portion of the fabric. Furthermore, the yarn can be used in heavy monofilaments used in higher tongue tear fabric, and in applications that use a high DPF fiber and can tolerate a gray-colored yarn.

EXPERIMENTAL

The experiments below were conducted to determine the feasibility of making yarn from agglomerated fibrous polymeric mixtures.

EXAMPLE 1

Edge trim scrap containing 23 percent by weight of nylon 6 and 77 percent by weight of PET was agglomerated using a CONDUX CV-50 Plastcompactor. The plastcompactor did not melt the polymer mixture but compacted it at a temperature near the glass transition temperature. The agglomerate particles were nominally 3 millimeters (mm) in diameter and had a gravel-like appearance. Some fuming, probably caprolactam monomer fumes, occurred during the agglomerating process. The agglomerate had a relative viscosity of about 2.03.

The agglomerate was then extruded in a rheometer (GOTTFERT® Rheograph 2002) and the resulting extrudate was tested to determine the effects of temperature and melt holding time on the relative viscosity of the extrudate and the effects of shear rate, temperature and melt holding time on the melt viscosity of the extrudate.

Tested were shear rates of 1000 l/s, 2000 l/s, 4000 l/s, and 8000 l/s; temperatures of 275° C., 278° C., 280° C., 282° C. and 285° C.; and melt holding times of 2, 6, 10, 14 and 18 minutes (the actual residence time was 2–3 minutes longer than the melt hold times). Each test used a die with a 0.5 mm (500 micrometer) diameter by 15 mm length capillary.

The relationship between the relative viscosity of the agglomerate extruded on the rheometer and the temperature and melt hold time is shown in FIG. 1. FIG. 1 shows a temperature-sensitive decrease in relative viscosity with time.

Figure 2A:
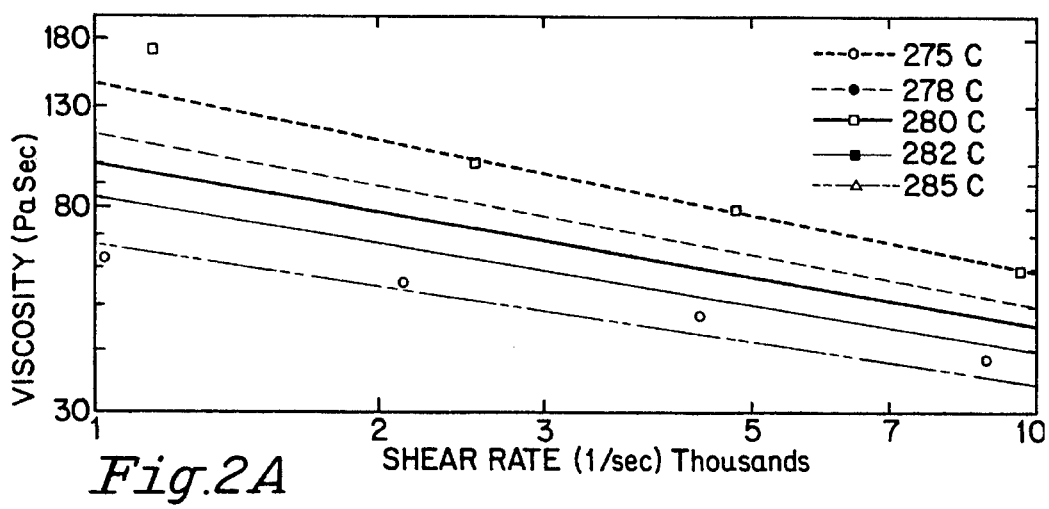
FIGS. 2A–2C are graphs showing the relationship between the melt viscosity of a rheometer-extruded nylon/PET agglomerate produced according to the process of this invention and the shear rate, temperature, and melt holding time.
Figure 2B:
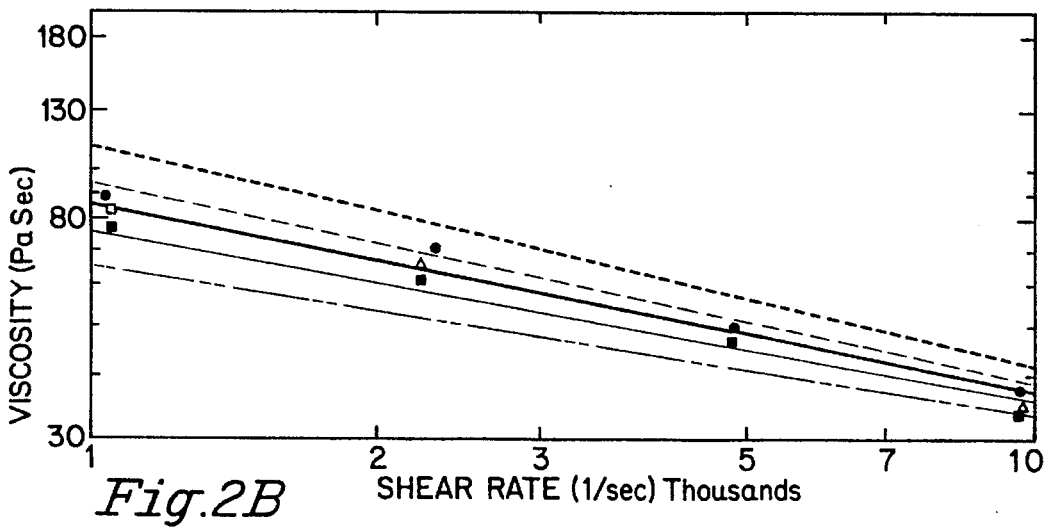
Figure 2C:
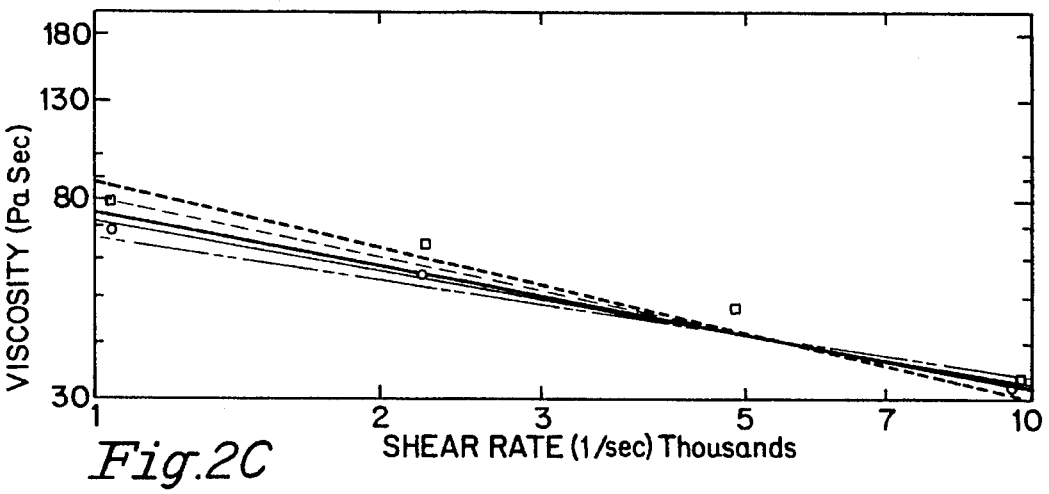

The relationship between the melt viscosity of the rheometer-extruded agglomerate and the shear rate, temperature, and melt hold time is shown in FIGS. 2A–2C. The melt hold time was 2 minutes in FIG. 2A, 10 minutes in FIG. 2B, and 18 minutes in FIG. 2C. In each of these figures, the actual residence time was 2–3 minutes longer than the hold time. FIGS. 2A–2C each show a temperature-sensitive decrease in melt viscosity with time.

EXAMPLES 2A–2F

The agglomerate produced in Example 1 was dried overnight and then extruded into water-quenched monofilaments at 15 lb/hr and 280° C. on a Leistritz counter-rotating twin screw extruder through a die with one 2 mm diameter hole. The monofilaments each had a nominal diameter of 3000 denier (600 micrometers). The nylon in the water-quenched monofilament existed as small globules surrounded by PET.

EXAMPLES 3A–3H

In Examples 3A–3H, using the extruded agglomerate formed in Example 2, fine denier undrawn yarns of 23 to 84 dpf were prepared and then hot-drawn on a drawtwister. These examples evaluated various spinneret capillary sizes and melt temperatures. Eight-hole spinnerets were drilled to form 800-micrometer or 1200-micrometer holes. One spinneret was used as is, nominally having 300-micrometer holes. Pump yields were varied from 7.7 grams/minute to 26 grams/minute. The yarn was taken up on a Schweiter winder after passing over a finish applicator and a godet. The godet speeds ranged from about 390 to about 830 meters/minute, with the corresponding winder speeds of about 393 meters/minute to about 835 meters/minute. A 30% emulsion of spin finish was liberally applied to the yarn.

The specific pump yields, spinneret hole sizes and winder speeds used in making the undrawn yarn samples are presented in Table I. The spinning temperature was 285° C. in Example 3C and 278° C. in the other examples. Morphological measurements of the undrawn yarn samples prepared in Examples 3E and 3F are shown in Table II.

Figure 3:
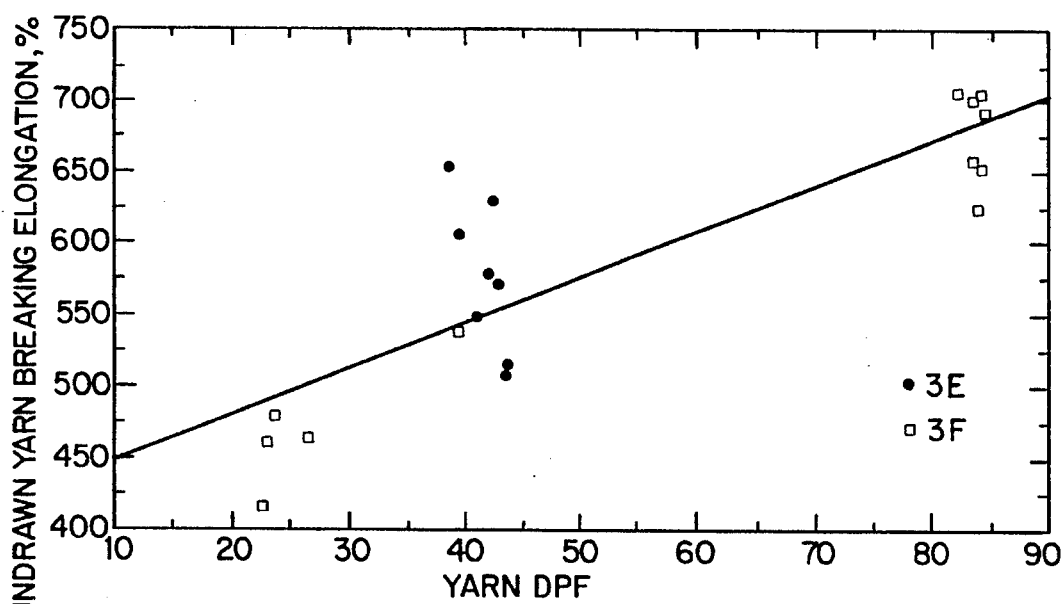
FIG. 3 is a graph plotting the relationship between undrawn yarn breaking elongation and undrawn yarn denier per filament values.

The relationship between undrawn yarn breaking elongation and yarn denier per filament (dpf) is shown in FIG. 3. In FIG. 3, the square points represent the samples prepared in Examples 3A–3H and also samples prepared under the same spinning conditions as Examples 3A, 3E and 3F. The dark round points in FIG. 3 represent the samples prepared in Examples 4A–4H, discussed hereinbelow.

TABLE I

Examples 3A–3H: Spinning Conditions

| Example No. | Pump Yield (g/min) | Spinneret Hole Size (um) | Winder Speed (m/min) | DPF | Tenacity g/denier | Breaking Elong. (%) |
|---|---|---|---|---|---|---|
| 3A | 28.5 | 800 | 385 | 84 | 0.90 | 695 |
| 3B | 7.7 | 800 | 385 | 23 | 0.82 | 460 |
| 3C* | 7.7 | 800 | 385 | 23 | 0.69 | 416 |
| 3D | 7.7 | 800 | 385 | 24 | 0.87 | 478 |
| 3E | 28.5 | 800 | 385 | 84 | 0.84 | 705 |
| 3F | 28.5 | 800 | 393 | 83 | 0.84 | 660 |
| 3G** | 28.5 | 1200 | 829 | 40 | 1.12 | 538 |
| 3H** | 9.2 | 1200 | 393 | 26 | 0.88 | 463 |

*Polymer forms drips after spinning for a short time.
**Yarn broke out during spinning first package.

TABLE II

Examples 3E and 3F: Morphological Measurements

| Example No. | Undrawn Yarn Rod Avg. Diameter (um) | % CV of Rod Diameter n > 20 | Yarn % Breaking Elongation |
|---|---|---|---|
| 3E | 0.57 | 32 | 705 |
| 3F | 0.33 | 36 | 660 |

Table I and FIG. 3 show that the yarn samples with the higher dpf values gave the highest breaking elongation. The higher dpf yarns were produced with short residence times. The higher dpf yarns, with their larger cross-sectional area, should also be less affected by the frequent inclusions observed in the yarn. Furthermore, the higher dpf yarns should be less oriented due to the higher ratio of pump speed to winder speed.

The undrawn yarn samples were then drawtwisted at 800 meters/minute with draw ratios of 3.00 and 3.25, between a hot godet at 90° C. and a hot plate. The hot plate temperature was varied between 20° C., 140° C. and 160° C.

EXAMPLES 4A–4H

Examples 4A–4H were carried out to investigate polymer filtration and to determine the effect of melt residence time on fiber behavior.

In Examples 4A–4F, water-quenched polymer samples were prepared from the extruded polymer blend prepared in Example 2 and collected in a beaker of cold water approximately five inches below the face of the spinneret. The water-quenched polymer samples were prepared using screens or grade 3 sintered metal candle filters (referred to as "G3 filters" in the tables hereinbelow) at mean residence times of 5, 10 or 20 minutes. Specific filters and mean residence times used are set forth in Table III. The sizes of the nylon globules in the water-quenched polymer samples are also recited in Table III.

TABLE III

Examples 4A–4F: Nylon Globule Sizes in Water-Quenched Polymer Samples

| Example No | Filter Type | Mean Residence Diameter (um) | Average Globule (n = 20) | Diameter % CV Breaking Elong. (%) | Undrawn Yarn |
|---|---|---|---|---|---|
| 4A | screen | 5 | 1.27 | 25 | 605 |
| 4B | G3 filter | 5 | 0.91 | 31 | 629 |
| 4C | screen | 10 | 0.79 | 35 | 549 |
| 4D | G3 filter | 10 | 0.88 | 41 | 570 |
| 4E | screen | 20 | 1.20 | 60 | 507 |
| 4F | G3 filter | 20 | 0.97 | 48 | 515 |

Table III shows that, in general, the use of grade 3 sintered metal candle filters resulted in slightly smaller nylon globules than did the use of screen filters. Residence time had little effect on the average globule size, but short residence times showed the least variation in globule sizes. The short residence times also coincided with the greater breaking elongations. The greater elongation may be due to the more uniformly sized globules or to the higher relative viscosity of the polymer blend or both.

In Examples 4A–4H, samples of the extrudate polymer blend prepared in Example 2 were spun to form undrawn yarn. During spinning, the polymer residence time was changed by adjusting the pump yield (15, 30 or 60 grams/minute) while maintaining a nearly constant 40 dpf by adjusting the number of filaments (8 or 32) and the winding speed (410 or 812 meters/minute). Packs with grade 3 sintered metal candle filters, grade 6 sintered metal candle filters and grade 10 sintered metal candle filters and without sintered metal filters were used, with all packs including screen filters. All spinnerets were drilled to have 800 micrometer holes. The specific mean residence times, filter types, winding speeds, and numbers of filaments used are set forth in Table IV. In Table IV, the terms "G3 Filter" "G6 Filter" and "G10 Filter" represent grade 3 sintered metal candle filters, grade 6 sintered metal candle filters and grade 10 sintered metal candle filters, respectively.

Figure 4:
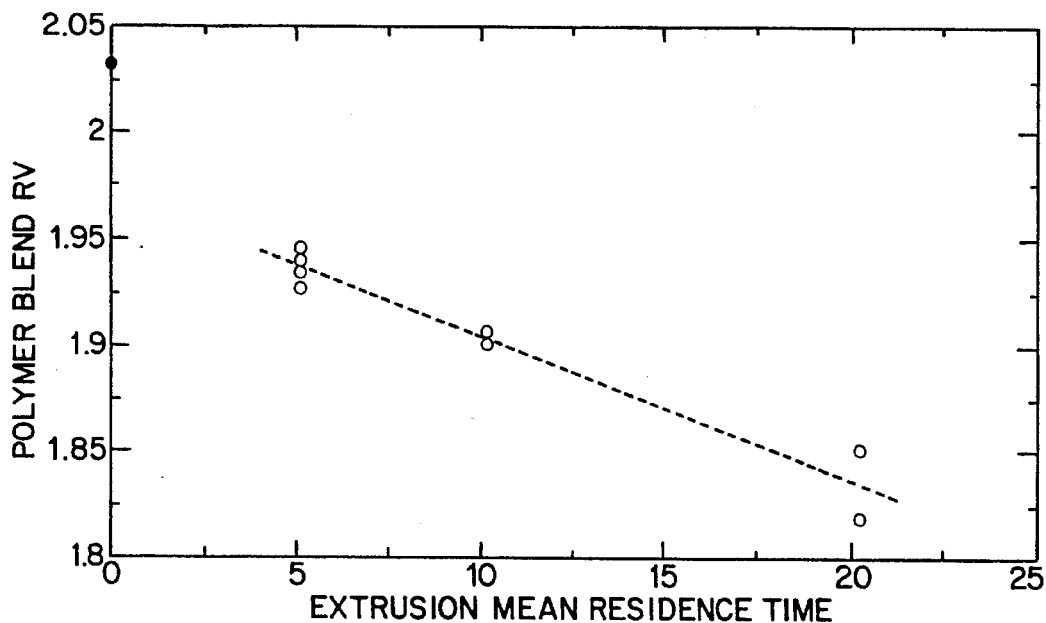
FIG. 4 is a graph plotting the relationship between the relative viscosity of a nylon/PET polymer blend and the extrusion mean residence time.
Figure 5:
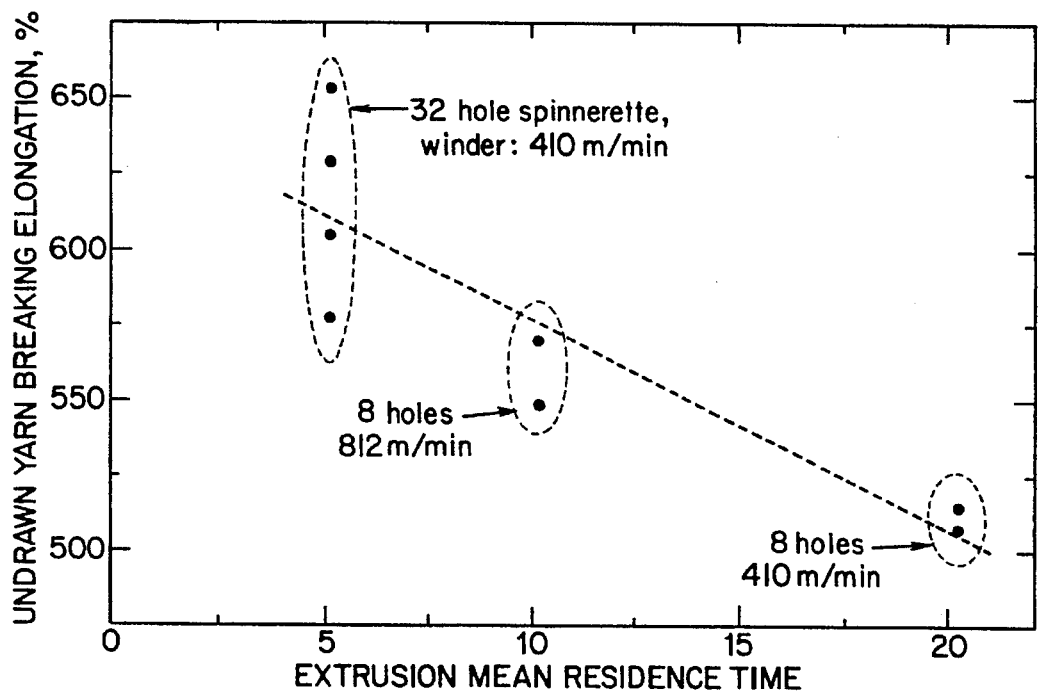
FIG. 5 is a graph plotting the relationship between the breaking elongation of undrawn nylon/PET yarn and the extrusion mean residence time.

The relationship between the relative viscosity of the polymer blend and the extrusion mean residence time is shown in FIG. 4. The relationship between the undrawn yarn breaking elongation and the extrusion mean residence time is represented in FIG. 5. In FIG. 5, the points of Group A represent breaking elongation values measured at an extrusion mean residence time of 5 minutes, wherein the dpf value of the undrawn yarn was 40, the number of filaments was 32 and the winding speed was 410 meters/minute. The points in Group B represent breaking elongation values measured at an extrusion mean residence time of 10 minutes, wherein the dpf value of the undrawn yarn was 40, the number of filaments was 8 and the winding speed was 812 meters/minute. The points in Group B represent breaking elongation values measured at an extrusion mean residence time of 20 minutes, wherein the dpf value of the undrawn yarn was 40, the number of filaments was 8 and the winding speed was 410 meters/minute.

TABLE IV-continued

Examples 4A–4H: Spinning Conditions and Properties - Undrawn Yarn

| Example No. | Mean Residence Time (min)* | Filter Type | Winding Speed (m/min) | Filaments (#) | DPF | Break Elong. (%) | Tenacity (g/den.) |
|---|---|---|---|---|---|---|---|
| E[c,d] | 20 | screen | 410 | 8 | 43.5 | 515 | 0.81 |
| F[c,d] | 20 | G3 filter | 410 | 8 | 43.3 | 508 | 0.89 |
| G[d] | 5 | G6 filter | 410 | 32 | 38.4 | 653 | 0.95 |
| H | 5 | G10 filter | 410 | 32 | 41.8 | 578 | 0.88 |

*Mean residence time based on pump yield and a system volume equivalent to 303 grams of molten polymer
[a]Rise of pack pressure during run
[b]High pack-pressure shutdown during run
[c]Buildup on the spinneret face
[d]Nubs in the yarn FIG. 4 shows that the polymer blend's relative viscosity decreased with increased extrusion mean residence time. As can be seen from Table IV and FIG. 5, when the dpf was held nearly constant, the extrusion mean residence time showed an effect on the breaking elongation of the yarn, although no similar trend was seen with the yard tenacity.

The type of filter appeared to have little effect on the yarn's physical properties but did have an effect on spinning performance. Sintered metal candle filters grade 3 filters caused rapid pack pressure build-up and the formation of polymer blobs under the spinneret. Grade 6 sintered metal candle filters performed much better than the grade 3 sintered metal candle filters but also caused pack pressure to rise. The grade 10 sintered metal candle filters and the screen filters provided the best spinning performances.

Morphological measurements of the undrawn yarn produced in Examples 4A, 4B, 4E, and 4F are presented in Table V.

TABLE V

Examples 4A, 4B, 4E, and 4F: Morphological Measurements of Undrawn Yarn

| Example No. | Water-Quenched Ave. Globule Dia. (μm) | Undrawn Yarn Rod Avg. Diameter (μm) | % CV of Rod Diameter n > 20 | Estimated Rod Length (μm) | Effective Globule-to-Rod Draw Down | Yarn % Break Elongation |
|---|---|---|---|---|---|---|
| 4A | 1.27 | 0.46 | 20 | 3.2 | 2.5 | 605 |
| 4B | 0.91 | 0.36 | 25 | 1.9 | 2.1 | 629 |
| 4E | 1.20 | 0.48 | 19 | 2.5 | 2.1 | 508 |
| 4F | 0.97 | 0.32 | 22 | 3.0 | 3.1 | 515 |

TABLE IV

Examples 4A–4H: Spinning Conditions and Properties - Undrawn Yarn

| Example No. | Mean Residence Time (min)* | Filter Type | Winding Speed (m/min) | Filaments (#) | DPF | Break Elong. (%) | Tenacity (g/den.) |
|---|---|---|---|---|---|---|---|
| A | 5 | screen | 410 | 32 | 39.3 | 605 | 0.92 |
| B[a] | 5 | G3 filter | 410 | 32 | 42.1 | 629 | 0.88 |
| C | 10 | screen | 812 | 8 | 40.8 | 549 | 1.06 |
| D[a,b] | 10 | G3 filter | 812 | 8 | 42.7 | 570 | 1.10 |

Although Table III shows that the more consistent globule sizes coincided with the greater yarn breaking elongation, Table V shows no similar trend with the variation in rod diameters.

The nylon globules were elongated into rods during the spinning process, with a typical globule stretching or draw down ratio of two to three.

The yarn produced in Examples 4A, 4B, 4E, and 4F was drawn on a godet stand, using a yarn buggy for a creel. Four undrawn ends were combined into a single drawn package. Draw ratios of 3.50, 3.30 and 2.95 were selected based on the breaking elongation of the undrawn yarn. The three godet duos were maintained at 90° C., with the first duo operating at 400 meters/minute and the second at 420 meters/minute, while the speed of the third duo was adjusted to give the desired draw ratio.

In these examples, filament wraps were occasionally observed under all conditions. The draw ratios used in these experiments were selected based on the breaking elongation values of the undrawn yarn samples to give similar drawn yarn breaking elongation values.

Table VI summarizes the physical properties of the drawn yarn samples.

TABLE VI

Examples 4A–4H: Drawn Yarn Physical Properties

| Example No. | Drawn DPF | Draw Ratio | % Breaking Elongation | Tenacity g/denier | % Dry Shrink 180° C. |
|---|---|---|---|---|---|
| 4A | 11.7 | 3.50 | 49.9 | 3.11 | 16.1 |
| 4B | 12.4 | 3.50 | 57.2 | 3.05 | 16.3 |
| 4C | 12.7 | 3.30 | 35.2 | 3.56 | 16.7 |
| 4D | 12.8 | 3.30 | 36.4 | 3.62 | 16.4 |
| 4E | 15.2 | 2.95 | 71.2 | 2.02 | 12.9 |
| 4F | 15.6 | 2.95 | 65.8 | 1.98 | 13.3 |
| 4G | 10.8 | 3.50 | 49.1 | 3.45 | 16.2 |
| 4H | 12.3 | 3.50 | 42.9 | 2.54 | 16.3 |

As can be seen from Table VI, yarn tenacities near 3 grams per denier were observed with breaking elongation values of near 50%.

Significant filament size variation may exist in the drawn yarn. This variation is not due to intermittent drawing but rather occurs in spinning. Most likely, the variation is due to variation in the spinneret capillary diameters and to the relatively short capillary length.

The drawn yarn may also contain several inclusions. Inclusions are common (typically one every 8 mm) in these filaments, with little difference from the type of filtration used or the melt residence time.

Drawing the yarn caused the nylon globules to become even more elongated. In SEM photographs of peeled surfaces of the drawn yarn, the nylon cannot be readily distinguished from the PET.

A sample of the undrawn yarn made in Example 4H was drawn at a 3.50 draw ratio on 90° C. godets and wound to maintain a flat yarn for insertion tests on a fleecing machine. The undrawn yarn was unrolled from the packages to maintain a flat yarn. The yarn was placed on the creel of a fleecing line and blown up the yarn tubes to the fleecing machines. Broken filaments caused yarn breakage in the yarn tubes before fabric samples could be produced.

Comparison Examples A–C

Three mixtures of virgin chip containing about 23% by weight of nylon and about 77% by weight of PET were extruded into water-quenched monofilaments at 15 lb/hr and 280° C. on a Leistritz counter-rotating twin screw extruder through a die with one 2 mm diameter hole. Screen filters and a mean residence time of 5 minutes were used in each comparison example.

The blends would not spin. Thus, only water-quenched samples for morphological study were collected.

The average diameters of the nylon globules, as well as the apparent viscosities of the nylon and PET, in the water-quenched virgin polymer microfilaments are presented in Table VII.

TABLE VII

Comparison Examples A–C:
Apparent Viscosities and Average Globule Diameters

| Example No. | Nylon Apparent Viscosity at 100/s, 280° C. (Pa S) | PET Apparent Viscosity at 100/s, 280° C. (Pa S) | Average Globule Diameter (micrometers) |
|---|---|---|---|
| A | 163 | 177 | 0.46 |
| B | 127 | 177 | 0.84 |
| C | 62 | 177 | 0.74 |

The data presented in Table VII illustrates that the smallest globules can occur when the PET and nylon viscosities are most similar. The smaller size of the globules in the virgin polymer mixture were expected to result in a more homogenous and easier spinning blend. However, while the virgin polymer blends gave generally smaller globule sizes, these blends would not spin. Thus, an effect other than blend morphology appears to be affecting the spinning ability of the blend.

Thus, the foregoing. examples show that yarn can be made from agglomerated nylon/PET scrap, and, further, that such yarn could not be made from mixed virgin polymers, even though the mixed virgin polymers formed morphologies like those of the recycled material.

What is claimed is:

1. A process of recycling a multicomponent mixed polymer waste material, comprising the steps of agglomerating the multicomponent mixed polymer waste material to form an agglomerate and spinning the agglomerate to form undrawn yarn, wherein the multicomponent mixed polymer waste material comprises a blend of at least two incompatible polymers.

2. A process according to claim 1, wherein the multicomponent mixed polymer waste material is fibrous.

3. A process according to claim 2, wherein the fibrous multicomponent mixed polymer waste material comprises a fibrous bicomponent polymer blend.

4. A process according to claim 1, wherein the multicomponent mixed polymer waste material is agglomerated at a temperature ranging from 10° C. above said material's glass transition temperature to about 10° C. less than said material's glass transition temperature.

5. A process according to claim 4, wherein the multicomponent mixed polymer waste material is agglomerated at said material's glass transition temperature.

6. A process according to claim 5, wherein the agglomerate has a melt viscosity ranging from about 75 to about 125 Pa Sec.

7. A process according to claim 6, wherein the agglomerate has a melt viscosity ranging from about 100 to about 125 Pa Sec.

8. A process according to claim 1, wherein the agglomerate comprises one or more additives selected from the group consisting of heat stabilizers, light stabilizers, delustrants, pigments, antistatic agents, and lubricants.

9. A process according to claim 8, wherein said one or more additives are present in said agglomerate in an amount of up to about 5% by weight.

10. A process according to claim 1, wherein the spinning step comprises passing the polymer mixture agglomerate through an extruder, a filter, and at least one spinneret, each of said at least one spinneret having capillaries with a diameter sufficient enough to substantially avoid filament breaks at the at least one spinneret, said filter having a filtration sufficient to substantially avoid increases in pack pressure and formation of polymer drips under the at least one spinneret; said spinning being carried out at a spinning temperature sufficient to allow substantial spinning of the polymer mixture agglomerate while avoiding substantial thermal degradation of one or more polymers in the polymer mixture agglomerate, with a mean residence time of the polymer mixture agglomerate in the at least one spinneret sufficient to avoid substantial thermal degradation of one or more polymers in the polymer mixture agglomerate.

11. A process according to claim 10, wherein the agglomerate is formed by agglomerating a bicomponent polymer blend comprising from about 20 to about 25 percent by weight of polycaproamide and from about 75 to about 80 percent by weight of polyethylene terephthalate; each of said at least one spinneret having capillaries with a diameter of from greater than about 300 micrometers to less than about 1200 micrometers; said filter being selected from screen filters or filters having a filtration ranging from about 40 micrometers to about 100 micrometers; the spinning temperature ranging from the group consisting of about 265° C. to about 285° C.; and the mean residence time ranging from about 5 to about 10 minutes.

12. A process according to claim 11, wherein each of said at least one spinneret has capillaries with a diameter ranging from about 600 to about 1000 micrometers.

13. A process according to claim 12, wherein each of said at least one spinneret has capillaries with a diameter of about 800 micrometers.

14. A process according to claim 11, wherein said filter is a filter having a filtration of about 100 micrometers or a screen filter.

15. A process according to claim 11, wherein the spinning temperature ranges from about 275° C. to about 285° C.

16. A process according to claim 15, wherein the spinning temperature ranges from about 275° C. to about 280° C.

17. A process according to claim 1, the agglomerate has a moisture content of less than 0.02 percent by weight.

18. A process according to claim 17, the agglomerate has a moisture content of less than 0.01 percent by weight.

19. A process according to claim 1, wherein the undrawn yarn has a denier per filament value of at least 20.

20. A process according to claim 1, wherein the undrawn yarn contains fibers having a fibril-matrix structure.

21. A process according to claim 1, further comprising the step of drawing the undrawn yarn in a continuous process with spinning or in a secondary discontinuous process after spinning.

22. A process according to claim 1, wherein the undrawn yarn is drawn in a second discontinuous process after spinning.

23. A process according to claim 22, wherein the undrawn yarn is drawn in said second discontinuous process over a godet having a temperature of from about 80° C. to about 100° C.

24. A process according to claim 23 wherein the godet has a temperature of about 90° C.

25. A process according to claim 21, wherein the undrawn yarn is drawn at a draw ratio of about 3.5 or lower.

26. A process according to claim 25, wherein the undrawn yarn is drawn at a draw ratio ranging from about 2.95 to about 3.0.

27. A process according to claim 26, wherein the undrawn yarn is drawn at a draw ratio ranging from about 2.95 to about 3.30.

28. A process according to claim 21, wherein the drawn yarn has a denier per filament value of about 6.

29. A process of recycling a multicomponent mixed polymer waste material, comprising spinning into yarn an agglomerate formed by a process comprising agglomerating a multicomponent polymer waste material containing a blend of at least two incompatible polymers.

30. A process according to claim 29, wherein the multicomponent polymer waste material is fibrous.

31. A process according to claim 1, wherein the multicomponent mixed polymer waste material comprises a blend of two incompatible polymers.

32. A process of recycling a bicomponent polymer blend comprising a polyamide and a polyester, comprising the steps of agglomerating the blend to form an agglomerate and spinning the agglomerate to form undrawn yarn.

33. A process according to claim 32, wherein the bicomponent polymer blend comprises from about 5 to about 95 percent by weight of polyamide and from about 95 to about 5 percent by weight of polyester.

34. A process according to claim 32, wherein the polyamide is polycaproamide.

35. A process according to claim 34, wherein the polycaproamide is a dicarboxylic acid-terminated polycaproamide.

36. A process according to claim 32, wherein the polyester is a polyester having a main polymer chain containing a repeating unit having from 1 to 2 aromatic rings.

37. A process according to claim 36, wherein the polyester is selected from the group consisting of polyethylene terephthalate; polybutylene terephthalate; polyethylene 2,6-naphthalene dicarboxylate; polyethylene 2,7-naphthalene dicarboxylate; polyhexamethylene 4,4'-diphenylsulfone dicarboxylate; and copolyesters thereof.

38. A process according to claim 37, wherein the polyester is polyethylene terephthalate.

39. A process according to claim 32, wherein the polyamide is polycaproamide and the polyester is polyethylene terephthalate.

40. A process according to claim 39, wherein the bicomponent polymer blend comprises from about 20 to about 25 percent by weight of polycaproamide and from about 75 to about 80 percent by weight of polyethylene terephthalate.

41. A process according to claim 40, wherein the bicomponent polymer blend comprises about 23 percent by weight of polycaproamide and about 77 percent by weight of polyethylene terephthalate.

* * * * *